(12) United States Patent
Elliott

(10) Patent No.: US 10,959,517 B2
(45) Date of Patent: Mar. 30, 2021

(54) ADJUSTABLE CADDY BRACKET

(71) Applicant: Kenney Manufacturing Company, Warwick, RI (US)

(72) Inventor: Timothy Elliott, Attleboro, MA (US)

(73) Assignee: Kenney Manufacturing Company, Warwick, RI (US)

( * ) Notice: Subject to any disclaimer, the term of this patent is extended or adjusted under 35 U.S.C. 154(b) by 0 days.

(21) Appl. No.: 16/911,088

(22) Filed: Jun. 24, 2020

(65) Prior Publication Data

US 2021/0059406 A1  Mar. 4, 2021

Related U.S. Application Data

(60) Provisional application No. 62/895,221, filed on Sep. 3, 2019.

(51) Int. Cl.
   *A47B 57/26* (2006.01)
   *A47B 45/00* (2006.01)
   *F16B 2/18* (2006.01)

(52) U.S. Cl.
   CPC .............. *A47B 57/26* (2013.01); *A47B 45/00* (2013.01); *F16B 2/185* (2013.01)

(58) Field of Classification Search
   CPC .......... A47B 57/26; A47B 45/00; F16B 2/185
   See application file for complete search history.

(56) References Cited

U.S. PATENT DOCUMENTS

| | | | | |
|---|---|---|---|---|
| 4,390,201 A | * | 6/1983 | Saunders | B60K 15/05 292/338 |
| 4,697,775 A | * | 10/1987 | Wille | A01K 97/10 248/214 |
| 5,758,851 A | * | 6/1998 | Remmers | A47B 61/003 211/105.1 |
| 7,059,025 B2 | * | 6/2006 | Edland | F16B 5/065 24/458 |
| 7,540,456 B2 | * | 6/2009 | Thompson | A47G 1/175 211/105.1 |
| 7,556,229 B2 | * | 7/2009 | Elliott | F16B 2/185 224/536 |
| 7,866,928 B2 | * | 1/2011 | Schmitz | F16B 2/185 411/34 |
| 8,225,946 B2 | | 7/2012 | Yang et al. | |
| 8,408,405 B2 | | 4/2013 | Yang et al. | |
| 9,339,151 B2 | | 5/2016 | Yang et al. | |
| 9,770,138 B2 | * | 9/2017 | Engell | A47K 3/281 |
| 9,883,742 B2 | | 2/2018 | Yang et al. | |

(Continued)

FOREIGN PATENT DOCUMENTS

| | | |
|---|---|---|
| CN | 108185786 A | 6/2018 |
| CN | 108778056 A | 11/2018 |

*Primary Examiner* — Ko H Chan
(74) *Attorney, Agent, or Firm* — Adler Pollock & Sheehan P.C.

(57) ABSTRACT

An adjustable caddy bracket includes a cam level handle, an interior of the cam level handle comprising a pair of cam level handle projections, a circular front plate, the circular front plate including front plate apertures to receive the pair of cam level handle projections, and a circular back plate, the circular back plate including a pair of back plate projections, the pair of back plate projections configured to receive and secure the pair of cam level handle projections through the front plate apertures.

8 Claims, 4 Drawing Sheets

(56) References Cited

U.S. PATENT DOCUMENTS

| | | | |
|---|---|---|---|
| 9,943,192 B2 | 4/2018 | Yang et al. | |
| 10,280,957 B2 * | 5/2019 | Mutch | F16B 2/185 |
| 2002/0172549 A1 * | 11/2002 | Koros | F16M 13/022 |
| | | | 403/322.4 |
| 2011/0226922 A1 * | 9/2011 | Ishizaki | F16B 47/006 |
| | | | 248/363 |
| 2014/0084118 A1 * | 3/2014 | Tooley | F16B 11/00 |
| | | | 248/205.3 |
| 2014/0353982 A1 * | 12/2014 | Wei | E05C 3/12 |
| | | | 292/197 |

* cited by examiner

ADJUSTABLE CADDY BRACKET

CROSS REFERENCE TO RELATED APPLICATIONS

This application claims priority from U.S. Provisional Application Ser. No. 62/895,221, filed Sep. 3, 2019, the entire disclosure of which is incorporated herein by reference in its entirety.

BACKGROUND OF THE INVENTION

The present invention relates caddies that extend downward along or parallel to a wall and that include shelves for holding accessories, and more particularly to an adjustable caddy bracket.

In general, storage caddies include baskets arranged vertically on a support member extending downward from an upper hook that engages a fixed hanging structure, such as a pipe. The baskets are typically rigidly mounted on the support member.

SUMMARY OF THE INVENTION

The following presents a simplified summary of the innovation in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

In an aspect, the invention features an adjustable caddy bracket including a cam level handle, an interior of the cam level handle comprising a pair of cam level handle projections, a circular front plate, the circular front plate including front plate apertures to receive the pair of cam level handle projections, and a circular back plate, the circular back plate including a pair of back plate projections, the pair of back plate projections configured to receive and secure the pair of cam level handle projections through the front plate apertures.

In another aspect, the invention features an adjustable caddy bracket including a base/back part, a front part, and a cam lever handle, the cam lever handle causing the front part and the base/back part to engage and disengage.

In still another aspect, the invention features a caddy including a wire basket, a wire frame, and an adjustable caddy bracket to variably and releaseably secure the wire basket to the wire frame.

These and other features and advantages will be apparent from a reading of the following detailed description and a review of the associated drawings. It is to be understood that both the foregoing general description and the following detailed description are explanatory only and are not restrictive of aspects as claimed.

BRIEF DESCRIPTION OF THE DRAWINGS

These and other features, aspects, and advantages of the present invention will become better understood with reference to the following description, appended claims, and accompanying drawings where:

DETAILED DESCRIPTION

Figure 1:
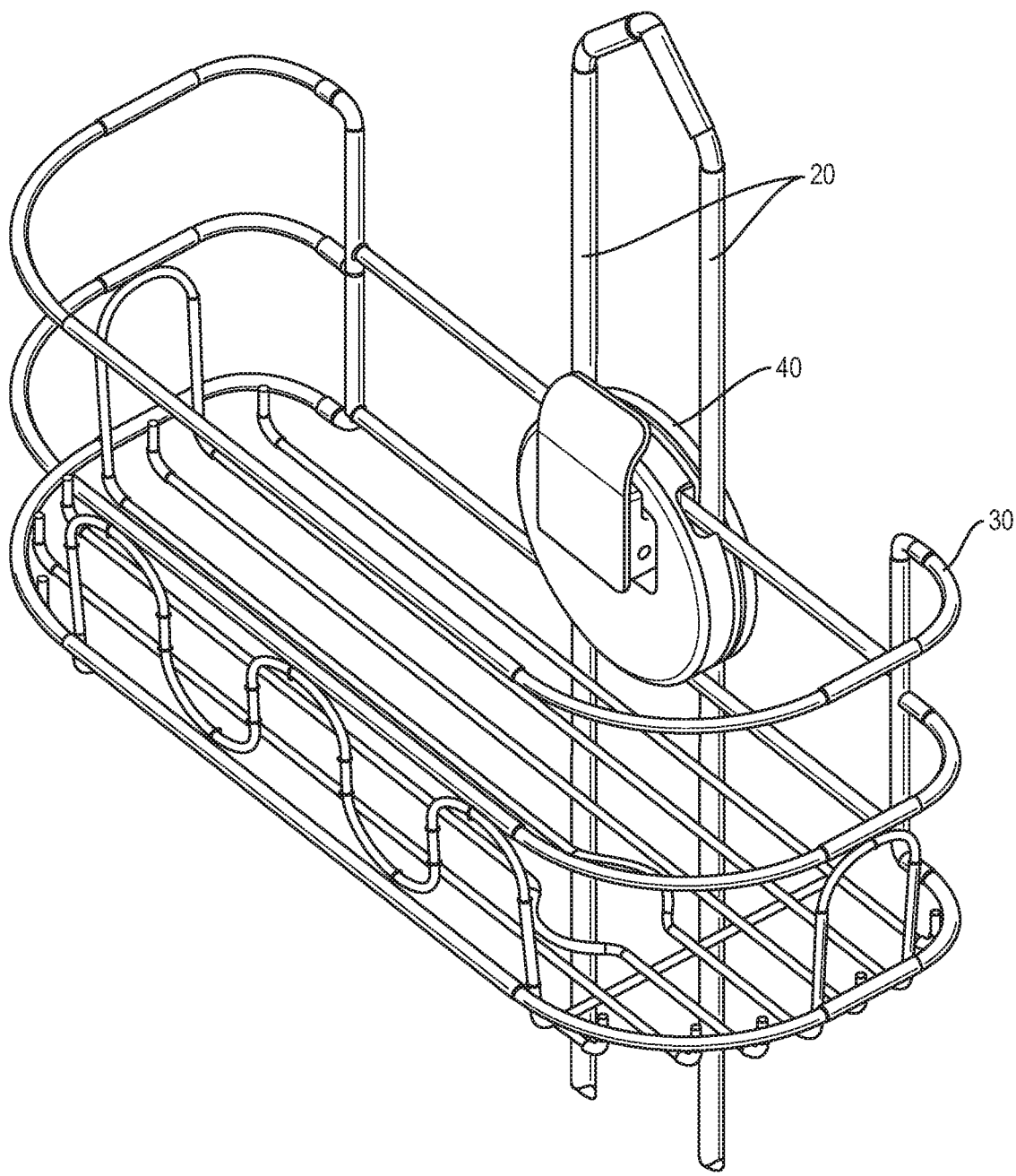
FIG. 1 illustrates an exemplary caddy storage system.

The subject innovation is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

The present invention provides a quick and ease of use for adjusting a hanging basket in a horizontal and vertical direction from a fixed member.

Referring now to FIG. 1, an exemplary caddy storage system 10 includes a hanger assembly 20, a basket 30 and an adjustable caddy bracket 40. Although one bracket 30 and one adjustable caddy bracket 40 are shown, other more common implementations can include multiple baskets and multiple adjustable caddies. In any implementation, an adjustable caddy bracket is paired with a basket to enable adjustment and fixation of the basket in a horizontal and vertical direction from a fixed member, such as the hanger assembly 20.

Figure 2:
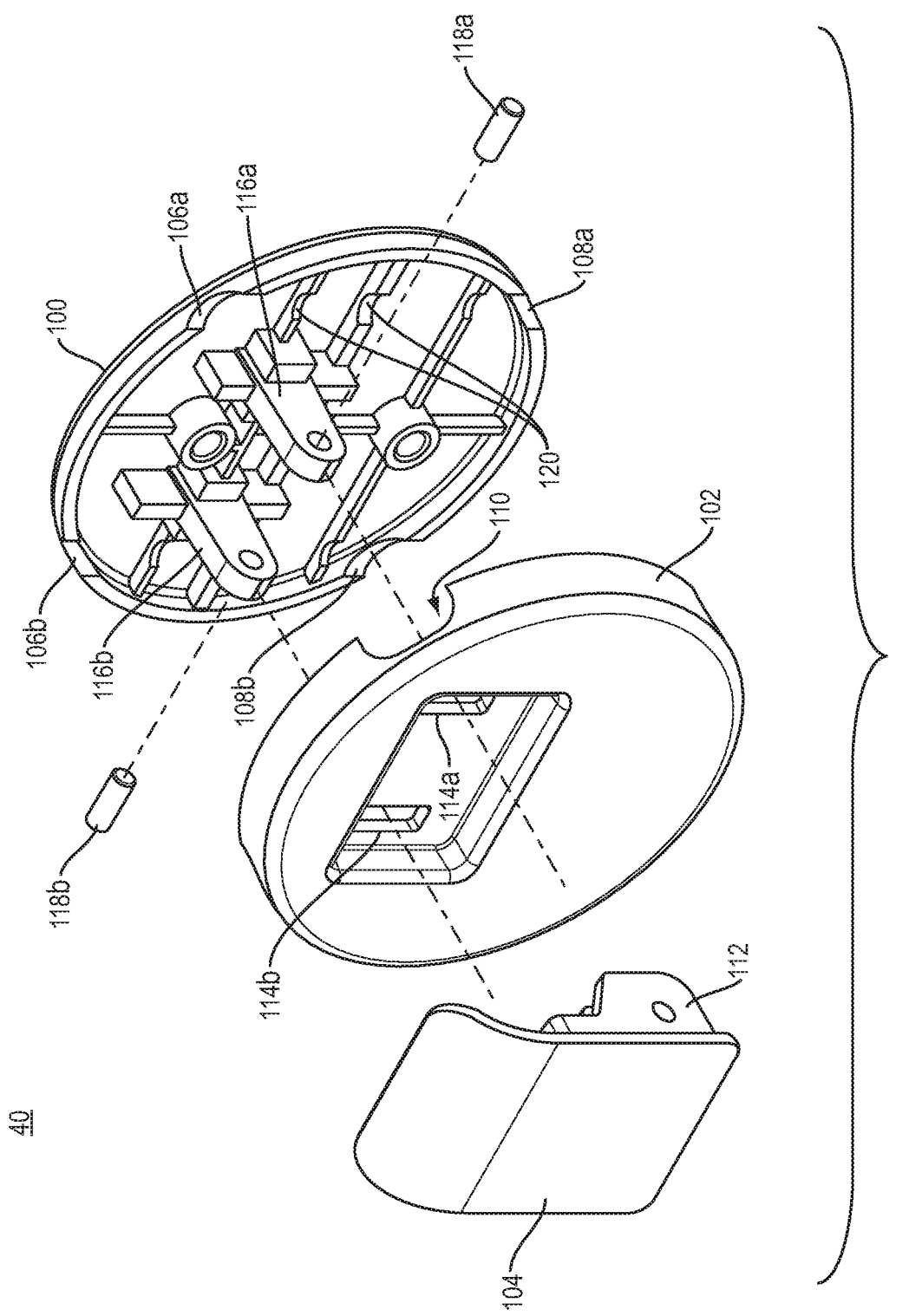
FIG. 2 illustrates a front prospective view of an exemplary adjustable caddy bracket.

As shown in FIG. 2, a front prospective view of the exemplary adjustable caddy bracket 40 is illustrated and includes three main parts, i.e., a base/back part 100, a front part 102 and a cam lever handle 104. A perimeter of the base/back part 100 includes upper cutouts 106a, 106a and lower cutouts 108a, 108b that are configured to align with corresponding cutouts 110 on an upper and lower perimeter of the front part 102. In addition, multiple surfaces 120 along an interior of the base/back part 100 are vertically positioned with respect to each other configured to make contact with frame wires of the basket. When the front part 102 is pressed against the base/back part 100, the cutouts and multiple surfaces capture vertical fixed frame members of a basket.

More specifically, the cam lever handle 104 includes cam level projections 112 that protrude through apertures 114a, 114b in the front part 102 and engage with projections 116a, 116b in the base/back part 100. This engagement is secured with a pair of pins 118a, 118b. When the cam lever handle 104 is positioned away from the front part 102, the front part 102 is separated from the base/back part 100. When the cam lever handle 104 is pushed against the front part 102, the front part 102 is pressed against the base/back part 100. As the front part 102 and the base/back part 100 are sandwiched together by the action of the cam lever handle 104, fixed frame members of a basket are captured and secured within the cutouts 106a, 106a, 108a, 108b, 110. Thus, the cam lever handle 104 enables opening and closing of the front part 102 and the base/back part 100 against fixed frame members of a basket, enabling easy repositioning of the basket.

Figure 3:
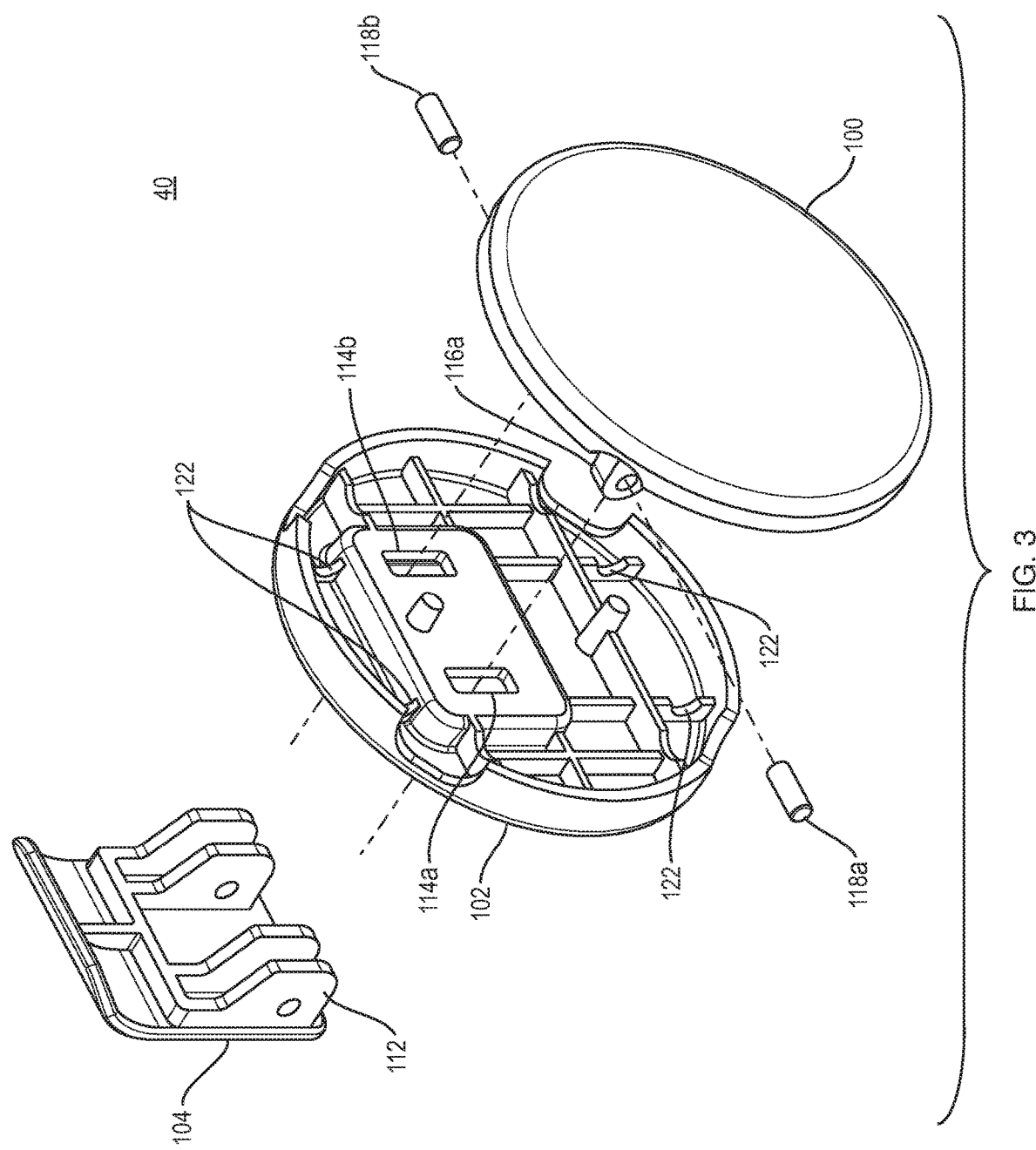
FIG. 3 illustrates a rear prospective view of the exemplary adjustable caddy bracket of FIG. 2.

As shown in FIG. 3, a rear prospective view of the exemplary adjustable caddy bracket 40 is illustrated and includes the same three main parts, i.e., a base/back part 100, a front part 102 and a cam lever handle 104. A surface of the front part 102 that faces the base/back part 100 includes multiple surfaces 122 along an interior that are horizontally positioned with respect to each other and are configured to make contact with horizontal frame wires of the basket.

Figure 4:
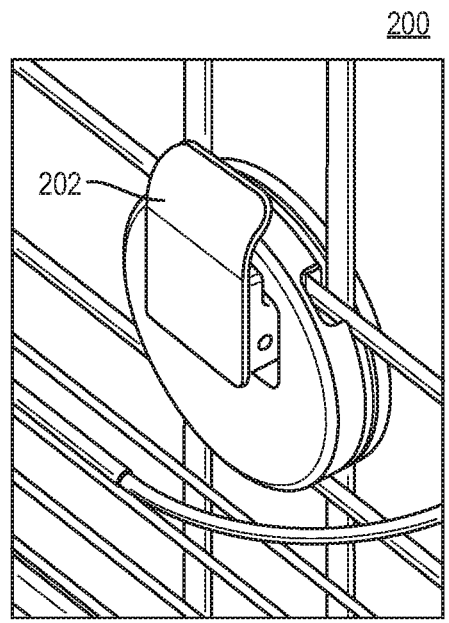
FIG. 4 illustrates a locked adjustable caddy bracket.

In FIG. 4, an exemplary adjustable caddy bracket 200 is illustrated in a locked position with its cam lever handle 202 engaged.

Figure 5:
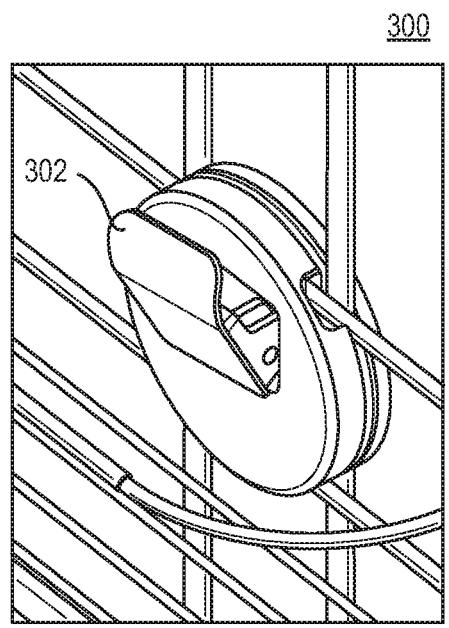
FIG. 5 illustrates an unlocked adjustable caddy bracket.

In FIG. 5, an exemplary adjustable caddy bracket 300 is illustrated in an unlocked position with its cam lever handle 302 disengaged.

While the present invention has been described with reference to certain embodiments thereof, it should be understood by those skilled in the art that various changes may be made and equivalents may be substituted without departing from the true spirit and scope of the invention. In addition, many modifications may be made to adapt to a particular situation, indication, material and composition of matter, process step or steps, without departing from the spirit and scope of the present invention. All such modifications are intended to be within the scope of the present invention.

What is claimed is:

1. An adjustable caddy bracket comprising:
a cam level handle, an interior of the cam level handle comprising a pair of cam level handle projections;
a circular front plate, the circular front plate comprising front plate apertures to receive the pair of cam level handle projections; and
a circular back plate, the circular back plate comprising a pair of back plate projections, the pair of back plate projections configured to receive and secure the pair of cam level handle projections through the front plate apertures.

2. The adjustable caddy bracket of claim 1 further comprising pins configured to secure the pair of back plate projections to the pair of cam level handle projections.

3. The adjustable caddy bracket of claim 2 wherein the circular back plate further comprises multiple surfaces along an interior that are vertically positioned with respect to each other and configured to make contact with vertical frame wires of a wire basket.

4. An adjustable caddy bracket comprising:
a cam level handle, an interior of the cam level handle comprising a pair of cam level handle projections;
a circular front plate, the circular front plate comprising front plate apertures to receive the pair of cam level handle projections; and
a circular back plate, the circular back plate comprising a pair of back plate projections, the pair of back plate projections configured to receive and secure the pair of cam level handle projections through the front plate apertures,
wherein the circular front plate further comprises multiple surfaces along an interior of the front plate that are horizontally positioned with respect to each other and configured to make contact with horizontal frame wires of the wire basket.

5. An adjustable caddy bracket comprising:
a base/back part;
a front part; and
a cam lever handle, the cam lever handle causing the front part and the base/back part to engage and disengage,
wherein a perimeter of the base/back part includes upper cutouts and lower cutouts that are configured to align with corresponding cutouts on an upper and lower perimeter of the front part,
wherein an interior of the base/back part that faces the front part includes multiple surfaces vertically positioned with respect to each other and are configured to make contact with frame wires of a basket,
wherein the cam lever handle includes cam level projections that protrude through apertures in the front part and engage with projections in the base/back part,
wherein an engagement is secured with a pair of pins.

6. The adjustable caddy bracket of claim 5 wherein the front part and the base/back part sandwich around the frame wires when the cam lever handle is engaged.

7. The adjustable caddy bracket of claim 6 a surface of the front part that faces the base/back part includes multiple surfaces along an interior that are horizontally positioned with respect to each other and are configured to make contact with frame wires of the basket.

8. A caddy comprising:
a wire basket;
a wire frame; and
an adjustable caddy bracket to variably and releaseably secure the wire basket to the wire frame,
the adjustable caddy bracket comprising:
a cam level handle, an interior of the cam level handle comprising a pair of cam level handle projections;
a circular front plate, the circular front plate comprising front plate apertures to receive the pair of cam level handle projections; and
a circular back plate, the circular back plate comprising a pair of back plate projections, the pair of back plate projections configured to receive and secure the pair of cam level handle projections through the front plate apertures,
wherein the adjustable caddy bracket further comprises pins configured to secure the pair of back plate projections to the pair of cam level handle projections,
wherein the circular back plate further comprises multiple surfaces along an interior that are vertically positioned with respect to each other and configured to make contact with vertical wires of a wire basket,
wherein the circular front plate further comprises multiple surfaces along an interior of the front plate that are horizontally positioned with respect to each other and configured to make contact with horizontal wires of the wire basket.

* * * * *